Dec. 21, 1965   MASAMITSU KAWAKAMI   3,225,226
ELECTRICAL VIBRATOR
Filed Aug. 15, 1963                                   2 Sheets-Sheet 1

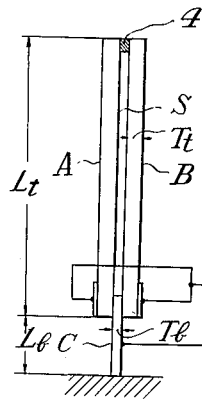
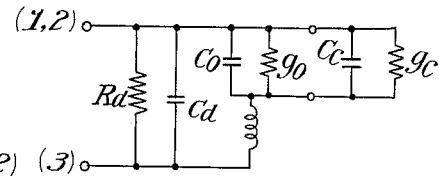
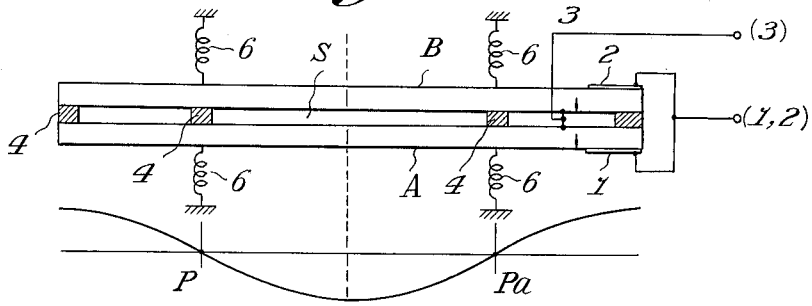
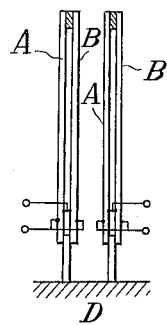
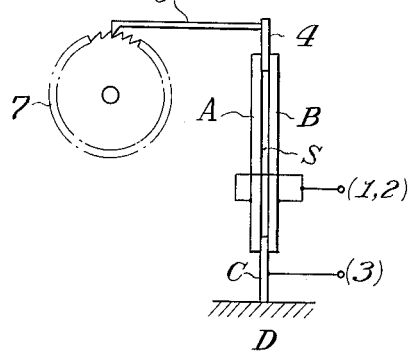

United States Patent Office 3,225,226
Patented Dec. 21, 1965

3,225,226
ELECTRICAL VIBRATOR
Masamitsu Kawakami, Setagaya-ku, Tokyo-to, Japan, assignor to Kabushiki Kaisha Toko Radio Coil Kenkyusho, Ota-ku, Tokyo-to, Japan, a joint-stock company of Japan
Filed Aug. 15, 1962, Ser. No. 217,060
Claims priority, application Japan, Sept. 8, 1961
36/32,937
6 Claims. (Cl. 310—8.6)

This invention relates to electrical vibrators utilized for various kinds of uses such as those for oscillating circuits of telecommunication equipment and power sources of electric timekeepers. More particularly, this invention relates to an electrical vibrator the vibration mode of which is of the flexure vibration type.

Heretofore, flexure-type electrical vibrators of ordinary kind which are electrostatically actuated have been, in general, of the type wherein, by bonding together two vibrator elements consisting of a polarized electrostriction material or piezoelectric material, fixing one end of this combination to a base, adapting the other end to be a free end, and causing, through the use of electric energy, the two vibrator elements alternately to be expanded and contracted, the combined vibrator is caused to undergo flexural vibration. In this case of two vibrator elements mutually bonded together in the above manner, however, various disadvantages are entailed.

For example, a shearing phenomenon tends to develop in the interface between the two elements, whereby a so-called shearing loss results, whereby the vibration efficiency is greatly lowered. Another disadvantage is that, since one end of the vibrating body is fixed to a base, a substantial quantity of vibration energy escapes from the vibrating body into the base, wherefore the effective Q of vibration becomes very low, being of the order of a few tens to a few hundreds according to actual measurements. Moreover, the frequency of natural vibration is limited to a range of the order of 50 to 2,000 cycles per second. As a result, it is necessary to add a suitable mass to the free end of the vibrating body in order to obtain low-frequency vibration or to reduce the dimensions of the vibrating body.

It is an object of the present invention to prevent the above-mentioned shearing loss created in the interface between the vibrating bodies bonded together as described above and thereby to increase the vibration efficiency of the vibrator.

It is another object of the invention to prevent in an effective manner the afore-named energy loss from the vibrating body to the base and thereby to improve greatly the effective Q of the vibration. It is still another object to provide an electrical vibrator of extremely lower power consumption, which is suitable for transistor circuits.

It is a further object to provide a miniature electrical vibrator which can be constructed to have extremely small dimensions.

The manner in which the foregoing objects may best be achieved will be clearly apparent by reference to the following description and illustrations in which like parts are designated by like reference numerals or letters, and in which.

Figure 3:
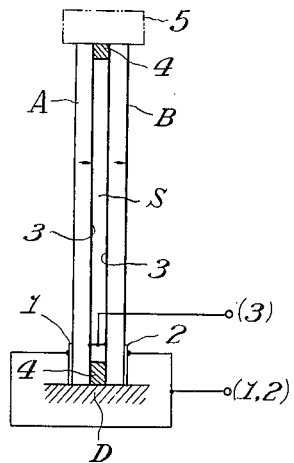
Figure 4:
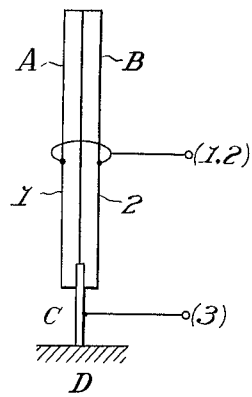

FIGS. 3, 4, and 5 are schematic diagrams, in elevational view, indicating representative embodiments of the electrical vibrator according to the present invention;

FIG. 6 is an electrical connection diagram analogous to the embodiments shown in FIGS. 4 and 5;

FIG. 7 is a schematic diagram showing still another embodiment of this invention;

FIGS. 8 and 9 are schematic diagrams indicating representative applications of the invention to practical use.

Figure 1:
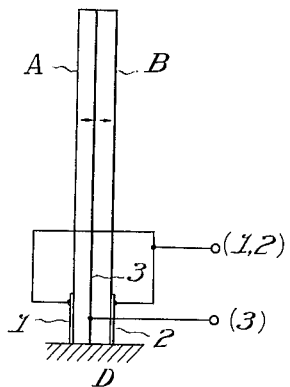
FIG. 1 is a schematic diagram, in elevational view, indicating the basic mode of a conventional electrical vibrator of general type.

The conventional flexure-type electrical vibrator shown in FIG. 1 is composed, as was aforementioned, of two vibrating elements A and B consisting of a polarized electrostriction material or piezoelectric material, the directions of polarization in this case being as indicated by the arrows in FIG. 1. One end of this vibrator is fixed to a base D. Electrodes 1 and 2 are provided on the opposite side surfaces of the elements A and B near the base, and an electrode 3 is provided between the elements A and B. By electrostatic actuation through these electrodes, the vibrating elements are alternately caused to be expanded and compressed, one side expanding as the other side is compressed, and thereby to undergo flexural vibration.

Figure 2:
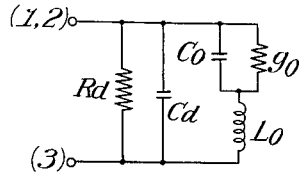
FIG. 2 is an electrical connection diagram analogous to the electrical vibrator of FIG. 1.

The electrical circuit shown in FIG. 2 is equivalent or analogous to the above-described electromechanical system of FIG. 1. That is, in FIG. 2, reference letter $Lo$ designates an inductance equivalent to the vibrating body; $Co$ designates an equivalent capacitance; $go$ designates an equivalent conductance; $Cd$ designates an equivalent capacitance between the electrodes; and $Rd$ designates a resistance equivalent to the loss of capacitance $Cd$.

According to the present invention, in order to eliminate shearing loss tending to develop during vibration in the interface between such two vibrating elements bonded together, the vibrating elements A and B, as shown in FIG. 3, are not bonded together, but between these elements, spacers 4 are inserted, forming a gap S therebetween. It has been found that the most effective positions of the spacers 4 are those which are set as near as possible to the nodal points of the vibration. In this case, the electrode 3 is, of course, provided on the inner surfaces of both vibrating elements A and B.

Although the two vibrating elements A and B are thus separated, since they are connected by the spacers 4, flexural vibration can be caused similarly as in the case of prior vibrator by applying electrostatic actuation so as to cause alternate expansion and compression. In this case, moreover, since a gap S is interposed between the vibrating elements A and B, the aforementioned shearing phenomenon cannot possibly occur between the said elements during vibration. Accordingly, it is possible to reduce, to an extreme degree, loss of energy due to shearing.

According to the present invention, furthermore, in order to prevent the escape of vibration energy from the vibrating body to the supporting base, a member C which has a higher compliance than that of a vibrating body AB made up of vibrating elements A and B is interposed between the said vibrating body A, B and the base D as indicated in FIG. 4. The material of this member C is one which has a high compliance and, preferably, as high a value of Q as possible. Such a material as, for example, amber, duralumin or beryllium copper, is suitable.

By thus interposing such a member C of higher compliance than the vibrating body, the escape of vibration energy from the vibrating body to the base D is suppressed by the member C to an extreme degree, whereby the effective Q of vibration is increased considerably, and a highly desirable effect is obtained. Furthermore, since the natural frequency of vibration of the vibrating body becomes low in relation to its dimensions, such conventional measures as adding a mass 5 to the free end of the vibrator (as indicated by intermittent line in FIG.

3) in order to reduce the dimensions become unnecessary. If, however, such a mass 5 is to be added, the dimensions can be reduced even further.

The equivalent or analogous circuit for the above case is shown in FIG. 6. It will be seen that the circuit of FIG. 6 is the circuit of FIG. 2 with the addition of a capacitance $Cc$ equivalent to the member C and an equivalent conductance $gc$. Accordingly, the total capacitance further becomes greater than that in the conventional case. Therefore, the vibrator becomes one of low impedance, wherefore it becomes suitable for combination with transistors. In this case, it is possible to improve, remarkably, the overall Q also by using a material of high Q for the member C.

In order to indicate still more fully the nature and details of the present invention, the following description is set forth with specific values.

The values of Q of the vibrator itself, of the member C, and of the entire combination of these parts, when denoted respectively by $Qo$, $Qc$, and $QT$, may be represented by the following equations:

$$Qo = \frac{\omega Co}{go}, \quad Qc = \frac{\omega Cc}{gc}$$

$$Q_T = \frac{\omega(Cd + Cc)}{go + gc}$$

From these equations, the following expression for QT is obtained.

$$Q_T = \frac{\left(1 + \frac{Cc}{Co}\right)}{\frac{Qc}{Qo} + \frac{Cc}{Co}} \times Qc$$

As one example, the following specific values will be assumed.

$$Qo = 100, \quad Qc = 5{,}000, \quad Cc = 10Co$$

Then, $$QT \doteq 917 = 9.17 Qo$$

This means that, in this case, the value of the total Q is improved by approximately nine times with respect to that of the conventional case.

The embodiment indicated in FIG. 5 is a combination of that shown in FIG. 3 with that of FIG. 4. In this combination, the vibrating elements A and B are spaced with a gap S therebetween, and, at the same time, the vibrating body AB is connected to the base D by way of a member C of high compliance interposed therebetween, the member C functioning additionally as a spacer. In this case, of course, the advantages of both of the embodiments shown in FIGS. 3 and 4 are available in combination.

Experimental data of Q of the embodiment of FIG. 5 are illustratively shown in the following table, wherein $Lt$, $Lb$, $Tt$, and $Tb$, are indicated in FIG. 5 and $fo$ and $W$ are, respectively, resonant frequency and width of the vibrating bodies A and B.

as illustrated in FIG. 3 may be added to the free ends of the vibrating bodies so as to enable reductions in their dimensions.

In the embodiment shown in FIG. 7, neither of the ends of the vibrating body is fixed, both said ends being free ends, and the vibrating body is supported elastically at its nodal points P and Pa by spring means 6. The two vibrating elements A and B are separated by spacers 4 which are positioned at the nodal points P and Pa and at the free ends. Such a method of elastic support as described above may be applied also to the case wherein the vibrating elements A and B are bonded together. In either case, by thus supporting the vibrating body at its nodal points in an elastic manner, instead of fixing the vibrating body to a base, the escape of vibration energy is suppressed to an extreme degree, whereby the vibration efficiency is greatly improved.

An embodiment of the invention wherein two vibrators according to the invention as illustrated in FIG. 5 (or FIG. 4) are used in the form of a tuning fork is indicated in FIG. 8. By this side-by-side arrangement of two vibrators, the two vibrators, mutually nullify the escape of vibration to the base D, whereby energy loss can be reduced even further.

The vibrator according to this invention may be utilized to drive, directly, the wheel train of an electronic timekeeper as indicated schematically in FIG. 9. In this example of such application, the spacer 4 at the free end of the vibrator is extended, and a driving member 8 is fixed to the outer end of the spacer 4 to drive a wheel train 7.

Although this invention has been described with respect to a few representative embodiments thereof, it is not to be so limited as charges and modifications may be made therein which are within the full intended scope of the invention, as defined by the appended claims.

What is claimed is:

1. An electric vibrator comprising, in combination, two parallel vibrating elements; a spacer between said elements near their top ends providing a gap therebetween; a member of higher compliance than said elements inserted therebetween from the bottom thereof, also acting as a spacer and connected, at its bottom, to a base; said bottom spacer reducing losses to the base; both said top plus bottom spacers preventing shear losses; electrodes disposed at the inner and outer surfaces of said elements; the elements being caused to vibrate upon impressing a voltage thereon.

2. The vibrator as defined in claim 1, wherein said member is one of said electrodes.

3. The vibrator as defined in claim 1, wherein said vibrating elements are of piezoelectric material.

4. The vibrator as defined in claim 1, wherein said vibrating elements are of polarized electrostrictive material.

5. The vibrator as defined in claim 1, wherein at least one of said spacers is disposed at a vibrational nodal point of said elements.

|  | A | B | C |
| --- | --- | --- | --- |
| $Lt$ | 14 mm | 12 mm | 12 mm. |
| $Lb$ | 3.5 mm | 4 mm | 2.5 mm. |
| $Tt$ | 0.2 mm | 0.2 mm | 0.2 mm. |
| $Tb$ | 0.1 mm | 0.1 mm | 0.1 mm. |
| $W$ | 2 mm | 2 mm | 2 mm. |
| $fo$ | 120 c./s | 140 c./s | 190 c./s. |
| Material of A and B | $Pb(Zr-Ti)O_3$ | $BaTiO_3$ | $BaTiO_3$. |
| Amplitude of end | 0.30 mm. PTP | 0.36 mm. PTP | 0.29 mm. PTP. |
| Input voltage | 4 volt PTP | 4 volt PTP | 4 volt PTP. |
| Q | 1,300–1,500 | 1,200–1,300 | 1,100–1,200. |

It will be obvious that, in each of the embodiments shown in FIGS. 4 and 5, the member C can be utilized additionally as the electrode 3 of the inner side; and that, in all of the foregoing embodiments, suitable mass 5

6. The vibrator as defined in claim 1, wherein said spacers are disposed at the ends of said elements.

(References on following page)

References Cited by the Examiner

UNITED STATES PATENTS

| | | | |
|---|---|---|---|
| 2,126,436 | 8/1938 | Williams | 179—110.1 |
| 2,202,391 | 5/1940 | Mason | 310—8.2 |
| 2,614,144 | 10/1952 | Howatt | 310—8.6 |
| 2,640,165 | 5/1953 | Howatt | 310—8.6 |
| 2,722,614 | 11/1955 | Fryklund | 310—8.6 |
| 2,747,090 | 5/1956 | Cavalieri et al. | 310—8.6 |
| 2,863,076 | 12/1958 | Koren et al. | 310—8.6 |
| 3,054,084 | 9/1962 | Parssinen et al. | 310—9.1 |
| 3,093,760 | 6/1963 | Tarasevich | 310—8.5 |
| 3,153,156 | 10/1964 | Watlington | 310—8.6 |

ORIS L. RADER, *Primary Examiner.*

MILTON O. HIRSHFIELD, *Examiner.*